(12) United States Patent
Katakawa (10) Patent No.: US 10,255,250 B2
(45) Date of Patent: Apr. 9, 2019

(54) MESSAGE PROCESSING DEVICE, MESSAGE PROCESSING METHOD, RECORDING MEDIUM, AND PROGRAM

(71) Applicant: Rakuten, Inc., Tokyo (JP)

(72) Inventor: Jun Katakawa, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 15/329,720

(22) PCT Filed: Jul. 31, 2014

(86) PCT No.: PCT/JP2014/070251
§ 371 (c)(1),
(2) Date: Jan. 27, 2017

(87) PCT Pub. No.: WO2016/017009
PCT Pub. Date: Feb. 4, 2016

(65) Prior Publication Data
US 2017/0212873 A1  Jul. 27, 2017

(51) Int. Cl.
*G06F 17/28* (2006.01)
*G06F 17/22* (2006.01)
*G06F 17/21* (2006.01)
*G06F 17/27* (2006.01)

(52) U.S. Cl.
CPC .......... *G06F 17/2223* (2013.01); *G06F 17/21* (2013.01); *G06F 17/275* (2013.01)

(58) Field of Classification Search
CPC .. G06F 17/28; G06F 17/2809; G06F 17/2818; G06F 17/2827; G06F 17/2836; G06F 17/2845; G06F 17/2854; G06F 17/2863; G06F 17/2872; G06F 17/289; G06F 17/2881

USPC ......................................................... 704/2-8
See application file for complete search history.

(56) References Cited

U.S. PATENT DOCUMENTS

| | | | | |
|---|---|---|---|---|
| 6,047,251 A * | 4/2000 | Pon | ...................... | G06K 9/6807 382/229 |
| 6,275,789 B1 * | 8/2001 | Moser | ................... | G06F 17/271 704/2 |
| 7,185,289 B1 * | 2/2007 | Taima | ..................... | G06F 9/454 715/810 |
| 7,228,269 B2 * | 6/2007 | Xun | ...................... | G06F 17/271 704/2 |

(Continued)

FOREIGN PATENT DOCUMENTS

| JP | 1-321554 A | 12/1989 |
|---|---|---|
| JP | 2002-135449 A | 5/2002 |

OTHER PUBLICATIONS

International Search Report for PCT/JP2014/070251 dated Oct. 7, 2014 [PCT/ISA/210].

*Primary Examiner* — Lamont M Spooner
(74) *Attorney, Agent, or Firm* — Sughrue Mion, PLLC (57) ABSTRACT

A message processing device (10) includes an estimator (11), an extractor (12), and an indicator (13). The estimator (11) estimates words understandable to a destination user (1). The extractor (12) extracts, from a message (3) created by a transmission originator user (2), a portion that does not match the words estimated by the estimator (11). The indicator (13) indicates, to the transmission originator user (2), the message (3) with the extracted portion by the extractor (12) being in an emphasized manner.

4 Claims, 11 Drawing Sheets

(56) References Cited

U.S. PATENT DOCUMENTS

| | | | | |
|---|---|---|---|---|
| 8,126,700 B2* | 2/2012 | Fasciani | | G06F 17/241 |
| | | | | 434/157 |
| 8,224,641 B2* | 7/2012 | Goswami | | G06F 17/289 |
| | | | | 704/1 |
| 8,533,051 B2* | 9/2013 | Platek | | G06Q 30/06 |
| | | | | 705/26.1 |
| 8,600,730 B2* | 12/2013 | Aue | | G06F 17/289 |
| | | | | 704/2 |
| 9,098,582 B1* | 8/2015 | Bass | | G06F 17/30882 |
| 2003/0125927 A1* | 7/2003 | Seme | | G06F 17/289 |
| | | | | 704/3 |
| 2003/0167250 A1* | 9/2003 | Sash | | G06F 17/30867 |
| 2004/0111254 A1* | 6/2004 | Gogel | | G06F 9/454 |
| | | | | 704/8 |
| 2004/0215455 A1* | 10/2004 | Kemp | | G10L 15/22 |
| | | | | 704/235 |
| 2006/0100858 A1* | 5/2006 | McEntee | | G06F 17/2247 |
| | | | | 704/10 |
| 2008/0109220 A1* | 5/2008 | Kiss | | G10L 15/26 |
| | | | | 704/235 |
| 2010/0082324 A1* | 4/2010 | Itagaki | | G06F 17/2836 |
| | | | | 704/2 |
| 2010/0204977 A1* | 8/2010 | Chiu | | G06F 17/275 |
| | | | | 704/2 |
| 2014/0143680 A1* | 5/2014 | Angarita | | G06F 17/30719 |
| | | | | 715/751 |
| 2014/0297254 A1* | 10/2014 | Yeo | | G06F 17/289 |
| | | | | 704/2 |
| 2014/0344279 A1* | 11/2014 | Shah | | G06F 17/2735 |
| | | | | 707/738 |
| 2015/0134336 A1* | 5/2015 | Huang | | G06F 17/30654 |
| | | | | 704/254 |
| 2015/0295876 A1* | 10/2015 | Newman | | G06Q 10/107 |
| | | | | 709/206 |
| 2015/0370914 A1* | 12/2015 | Carroll | | G06F 17/30905 |
| | | | | 709/203 |
| 2015/0371222 A1* | 12/2015 | Carroll | | G06Q 20/38 |
| | | | | 705/39 |
| 2017/0091174 A1* | 3/2017 | Rubin | | G06F 17/289 |
| 2017/0140563 A1* | 5/2017 | No | | G06T 11/60 |

* cited by examiner

MESSAGE PROCESSING DEVICE, MESSAGE PROCESSING METHOD, RECORDING MEDIUM, AND PROGRAM

CROSS REFERENCE TO RELATED APPLICATIONS

This application is a National Stage of International Application No. PCT/JP2014/070251, filed on Jul. 31, 2014, the contents of all of which are incorporated herein by reference in their entirety.

TECHNICAL FIELD

The present disclosure relates to a message processing device, a message processing method, a non-transitory recording medium, and a program.

BACKGROUND ART

In recent years, message transmission via the Internet has become common. When a message is transmitted via the Internet, if such a message is not written in a language understandable to a destination user, the destination user is unable to understand the message, and thus the message will fail to accomplish the purpose. Accordingly, a message is converted into a language understandable to a destination client for each destination user, and the converted message is transmitted.

A technology that automatically switches a language of a message to be sent is already present. For example, Patent Literature 1 discloses a device that creates facsimile data from an electronic mail, and transmits the created facsimile data to a transmission destination. When transmitting data, this device determines whether or not the transmission originator data attached to a from address of the electronic mail contains any Japanese words, and when determining that Japanese words are contained, the device encodes a message body text of the mail by a Japanese character code, and when determining that no Japanese words are contained, the device encodes the message body text of the mail by an English character code, and, creates the facsimile data.

CITATION LIST

Patent Literature

Patent Literature 1: Unexamined Japanese Patent Application Kokai

SUMMARY OF INVENTION

Technical Problem

According to the conventional technology, however, only the language of the entire message is identified, and whether or not a destination user can understand the language of the message is not taken into consideration appropriately. According to the disclosure in the aforementioned Patent Literature 1, the character code applied to encode a from address and a message body text is simply determined based on whether or not the transmission originator data attached to the from address contains any Japanese words. In this disclosure, whether or not the destination user can understand is completely out of consideration. Thus, messages are sometimes transmitted in a language that is not understandable to the destination user. In order to address such cases, a technology to create a message in a language understandable to the destination user is desired.

The present disclosure has been made in view of the aforementioned technical problems, and an objective of the present disclosure is to realize a message processing device capable of easily creating a message with words understandable to a destination user.

Solution to Problem

To achieve the objectives above, there is provided in accordance with a first aspect of the present disclosure, a message processing device that includes:
  an estimator that estimates a word understandable to a destination user;
  an extractor that extracts, from a message created by a transmission originator user, a portion that does not match the estimated word; and
  an indicator that indicates, to the transmission originator user, the message with the extracted portion being in an emphasized manner.

In the message processing device according to the first aspect of the present disclosure, the estimator may estimate the word understandable to the destination user based on a language that is associated with a template of the message utilized when the transmission originator user creates the message.

In the message processing device according to the first aspect of the present disclosure, the estimator may estimate, based on a character code that appears in the message created by the transmission originator user, a main language of the message, and estimate that the word of the estimated language is the word understandable to the destination user.

In the message processing device according to the first aspect of the present disclosure, the estimator may estimate that a word selected in a previous time by the destination user when given a choice is the word understandable to the destination user.

In the message processing device according to the first aspect of the present disclosure may further include:
  a presenter that presents, to the destination user, choices that express a concept in a plurality of different languages,
  in which the estimator may estimate that the word contained in the selected choice by the destination user among the choices presented in a previous time is the word understandable to the destination user.

In the message processing device according to the first aspect of the present disclosure may further include:
  a presenter that presents, to the destination user, a plurality of choices containing a first choice that expresses a concept with a word in a first language, and a second choice that expresses the concept with a word in a second language that is different from the first language,
  in which the estimator may estimate that, when the destination user selected the first choice in a previous time, the word contained in the first choice is the word understandable to the destination user, and when the destination user selected the second choice in a previous time, estimates that the word contained in the second choice is the word understandable to the destination user.

The message processing device according to the first aspect of the present disclosure may further include a transmitter that selects, based on the estimated main language of the message, an additional phrase among a plurality of additional phrases recorded in advance language by language, adds the selected additional phrase to the message, and transmits the message.

To achieve the objectives above, there is provided in accordance with a second aspect of the present disclosure, a message processing method that includes:
estimating a word understandable to a destination user;
extracting, from a message created by a transmission originator user, a portion that does not match the estimated word; and
indicating, to the transmission originator user, the message with the extracted portion being in an emphasized manner.

To achieve the objectives above, there is provided in accordance with a third aspect of the present disclosure, a non-transitory computer readable recording medium having stored therein a program that causes a computer to execute:
an estimating process of estimating a word understandable to a destination user;
an extracting process of extracting, from a message created by a transmission originator user, a portion that does not match the estimated word; and
an indicating process of indicating, to the transmission originator user, the message with the extracted portion being in an emphasized manner.

To achieve the objectives above, there is provided in accordance with a fourth aspect of the present disclosure, a program that causes a computer to execute:
an estimating process of estimating a word understandable to a destination user;
an extracting process of extracting, from a message created by a transmission originator user, a portion that does not match the estimated word; and
an indicating process of indicating, to the transmission originator user, the message with the extracted portion being in an emphasized manner.

Advantageous Effects of Invention

According to the present disclosure, a message can be easily created with words understandable to a destination user.

DESCRIPTION OF EMBODIMENTS

Embodiments of the present disclosure will be described below with reference to the accompanying figures.

First Embodiment

A message processing device 10 according to a first embodiment of the present disclosure has, for example, a function that allows a virtual store (a transmission originator user) in an Internet market to create a message to be transmitted to a client (a destination user). The message processing device 10 provides, when the transmission originator user creates a message to be distributed to the destination user, a function to prevent the created message from containing words that are not understandable to the destination user.

When general consumers purchase products from a virtual store (hereinafter, referred to as a shop) over the Internet, it is common that the shop transmits, to a purchaser, a message that notifies of the business details. The message to be transmitted by the shop is desirably written in a language understandable to a purchaser, and normally, the message written in a language that has been applied by the purchaser in the purchasing process is transmitted.

However, the purchaser who has executed the purchasing process over the Internet in a certain language does not always have a language proficiency level in this particular language to completely understand the details written in the message. The language proficiency level of the purchaser may be sufficient to understand a product name and sales price without any problem, and to proceed to a purchasing process, but may not be at a level to read sentences. In this case, although the shop transmits, to the purchaser, the message written in the language that has been applied in the purchasing process, the message is not understandable to the purchaser.

To prevent such circumstances, the message processing device 10 according to the first embodiment of the present disclosure indicates, to the shop (the transmission originator user), when the message to be transmitted contains words that are not understandable to the purchaser (the destination user), this portion in an emphasized manner. The transmission originator user edits the indicated and emphasized portion, and thus the message containing words or phrases that are not understandable to the destination user is prevented from being transmitted.

Figure 1:
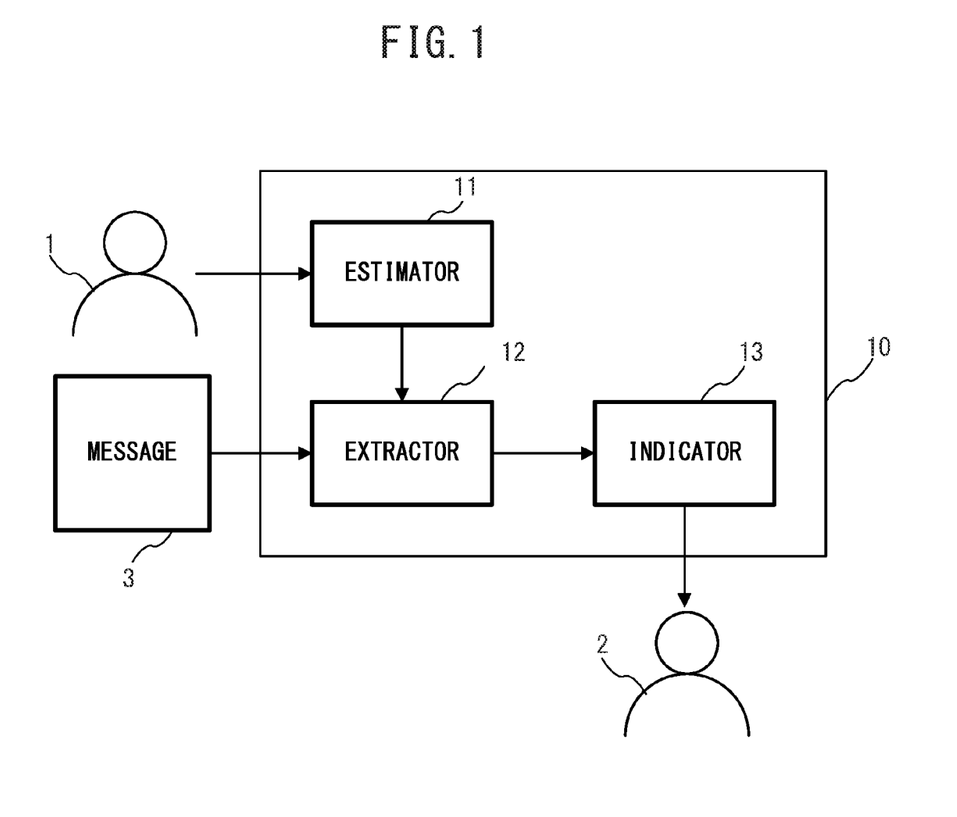
FIG. 1 is a block diagram illustrating a functional structure of a message processing device according to a first embodiment.

The message processing device 10 of the first embodiment includes, as illustrated in FIG. 1, an estimator 11, an extractor 12, and an indicator 13 as functions.

The estimator 11 estimates texts that are understandable to a destination user 1. More details of an operation of the estimator 11 will be discussed later.

The extractor 12 extracts, from a message 3, portions that do not match the words estimated by the estimator 11. The message 3 in this case is a message that has been created or is being created by a transmission originator user 2, and is to be transmitted to the destination user 1.

The indicator 13 indicates, to the transmission originator user 2, the message 3 with the portion extracted by the extractor 12 in an emphasized manner.

In addition to the functions described above, the message processing device 10 includes typical functions (providing a user interface to edit messages, recording and updating created messages, and the like) relevant to messages creation. With these functions, when the transmission originator user 2 creates the message 3 to be distributed to the destination user 1, the message processing device 10 verifies whether or not any words not understandable to the addressed user 1 are contained in the created message 3, and if such words are contained, indicates to the transmission originator user 2, the words in an emphasized manner.

Figure 2:
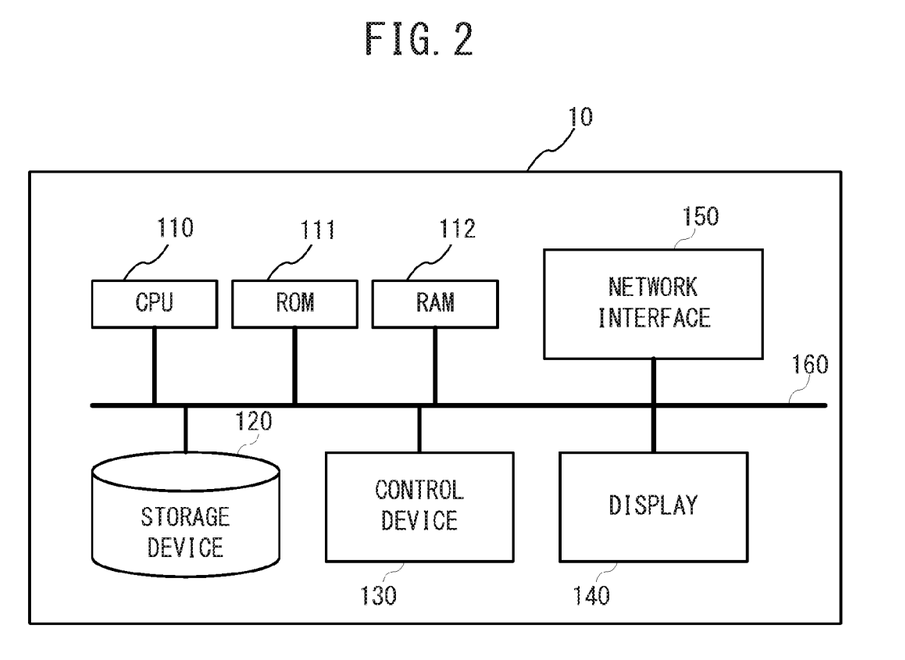
FIG. 2 is a block diagram illustrating a hardware structure of the message processing device.

The message processing device 10 of this embodiment includes, as illustrated in FIG. 2, a Central Processing Unit (CPU) 110, a Read Only Memory (ROM) 111, a Random Access Memory (RAM) 112, a storage device 120, a control device 130, a display 140, and a network interface 150 as hardware, and, these hardware components are connected to one another via an internal bus 160.

The CPU 110 executes programs stored in the ROM 111, the RAM 112, and the storage device 120 to control the entire message processing device 10. The CPU 110 reads as needed, from the ROM 111, the RAM 112, and the storage device 120, the programs to be executed, and stores data in the RAM 112, and the storage device 120 as needed. The CPU 110 functions as components (the estimator 11, the extractor 12, and the indicator 13) that realize the respective functions described above.

The ROM 111 stores programs that will be needed when the CPU 110 is operated, for example, a program that the CPU 110 initially executes when the message processing device 10 is activated.

The RAM 112 functions as a work area when the CPU 110 executes the program. That is, the RAM 112 records a running program that is being executed by the CPU 110, or temporary data necessary for the CPU 110 to execute the program, and provides such data to the CPU 110 in accordance with a request from the CPU 110.

The storage device 120 includes a storage media, such as a hard disk drive and a flash memory, and stores data necessary to operate the message processing device 10.

The storage device 120 records, for example, the program to be executed by the CPU 110, or data that is referred when the CPU 110 executes the program, and provides such data to the CPU 110 in accordance with a request from the CPU 110. In addition, the storage device 120 records the data output by the CPU 110 in accordance with a request from the CPU 110.

The control device 130 includes a keyboard, a mouse, and the like, and accepts an input operation by the transmission originator user 2, and transmits the input operation to the CPU 110.

The display 140 displays necessary information to the transmission originator user 2.

The network interface 150 connects the message processing device 10 with a network (unillustrated). When the message processing device 10 transmits information to the other device via the network, or receives information from the other device, the network interface 150 transmits, to the other device via the network, the information received from the CPU 110 via the internal bus 160 which will be discussed later, and transmits to the CPU 110 via the internal bus 160, the information received from the other device via the network. For example, the message processing device 10 transmits an electronic mail to the destination user 1 via the network interface 150 over the Internet.

The network interface 150 may, for example, connect the message processing device 10 with the network via a cable, or connect the message processing device 10 with the network by wireless communication.

The internal bus 160 relays information exchange among structural components (the CPU 110, the ROM 111, the RAM 112, the storage device 120, the control device 130, the display 140, the network interface 150, and the like) in the message processing device 10. For example, when the CPU 110 attempts to read necessary data from the storage device 120, the CPU 110 reads the data from the storage device 120 via the internal bus 160.

Figure 3:
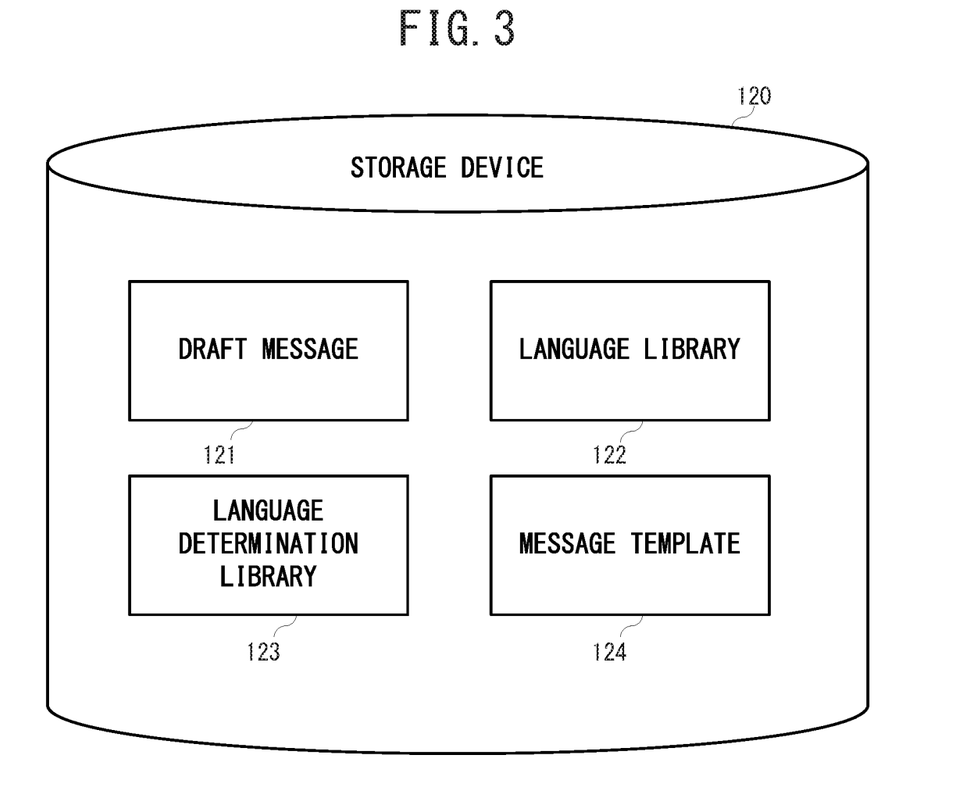
FIG. 3 is a diagram for explaining a memory area provided in a storage device.

According to the message processing device 10 of this embodiment, the storage device 120 has, as illustrated in FIG. 3, an area to record a draft message 121, an area to record a language library 122, an area to record a language determination library 123, and an area to record a message template 124. The storage device 120 outputs these pieces of data to the CPU 110, or stores the data that are output by the CPU 110 in these areas in accordance with a request from the CPU 110.

The draft message 121 is the message 3 that is created by the transmission originator user 2 to be transmitted to the destination user 1, and has not been transmitted yet. The message processing device 10 records, in the storage device 120, the draft message 121 created by the transmission originator user 2. Subsequently, after transmitting the draft message 121 to the destination user 1, the message processing device 10 deletes this draft message 121, or transfers this draft message to another area, or another device.

The language library 122 is data that records character codes for respective languages that are processable by the message processing device 10, characters, words, or the like utilized in these languages. The message processing device 10 records the language library 122 of each language in the storage device 120.

The language determination library 123 is data for the message processing device 10 to determine the language of the words contained in the draft message 121. To determine the language of the words, the message processing device 10 can employ, for example, a determination scheme based on the character code of the words, a determination scheme based on whether or not the words are recorded in the language dictionary, and a determination scheme based on features of the characters contained in the words and the spelling thereof. The message processing device 10 records, in the storage device 120, the language determination library 123 that is necessary for the language determination, and reads the language determination library as needed.

As for the determination scheme based on the character code, when the character code of the word subjected to the determination is the character code applied in only a specific language, the message processing device 10 determines that this word belongs to this specific language. For example, characters or words written in hiragana characters and katakana characters are recorded with a unique character code to Japanese in the message processing device 10. When the words recorded with the unique character code to Japanese are contained in the draft message 121, the message processing device 10 determines that the words belong to Japanese.

Likewise, when, for example, characters (Hangul) recorded with a character code specific to Korean are contained in the draft message 121, the message processing device 10 determines that the words belong to Korean. When the draft message 121 contains words recorded in Simplified Chinese characters or Traditional Chinese characters (both characters are represented by a character code applied only in Chinese), the message processing device 10 determines that the words belong to Chinese.

The message template 124 is data that will be a template for the draft message 121, and is, for example, data that contains in advance items that are common to many of the messages to be transmitted by the transmission originator user 2, such as the message body texts, and contact information in the messages to be transmitted. When the transmission originator user 2 creates the draft message 121 with the message processing device 10, the message processing device copies the message template 124 to create the draft message 121, and edits only the portions that need to be edited, and thus a new draft message 121 can be created easily.

The message processing device 10 records, in the storage device 120, the message template 124 for each applicable language. In addition, when the created draft message 121 is the draft message created by utilizing the message template 124, the message processing device 10 records what language the message template 124 has applied and edited to create this draft message 121. In addition, when the transmission originator user 2 desires to create a message without a template, the message processing device 10 can create a message without utilizing a template (or by utilizing a template with no effective data).

Figure 4:
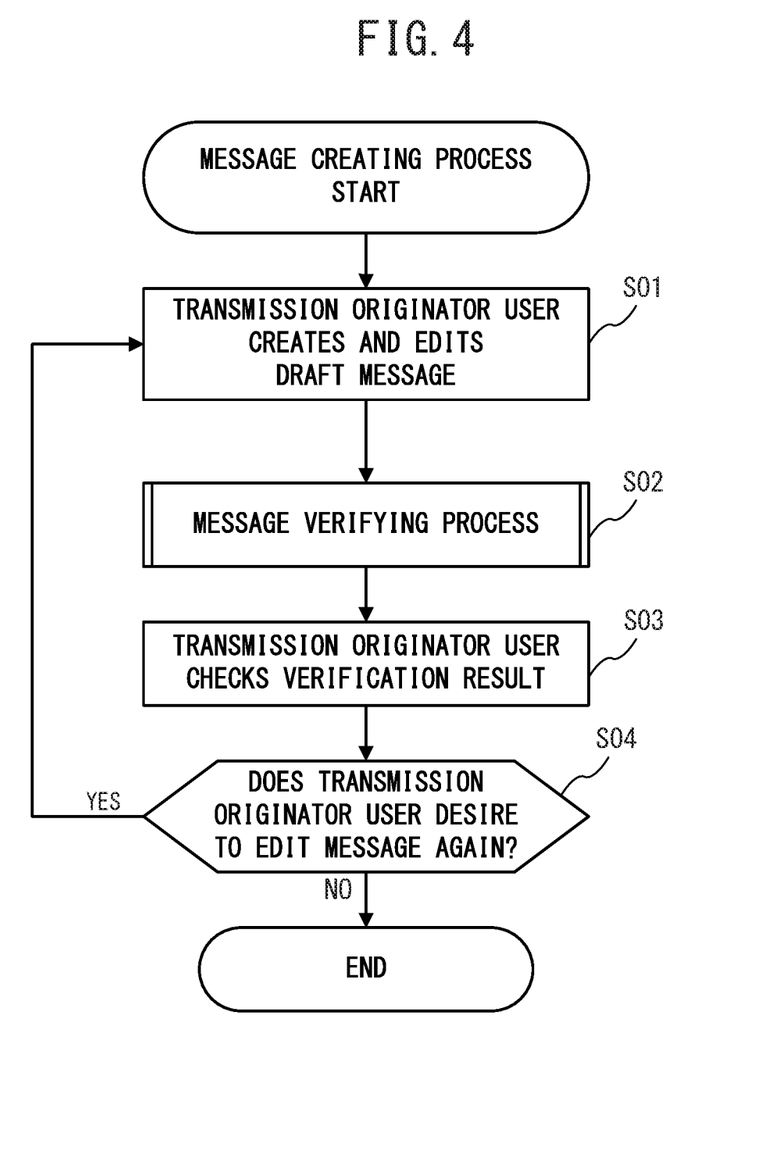
FIG. 4 is a flowchart illustrating a message creating process.

The message processing device 10 of the first embodiment performs a message creating process according to a flowchart illustrated in FIG. 4. Hereinafter, the message creating process will be explained.

At the beginning of the message creating process, the CPU 110 accepts an input by the transmission originator user 2, creates and edits the draft message 121 in accordance with this operation (step S01). In this step, for example, the CPU 110 reads, from the storage device 120 in accordance with the operation by the transmission originator user 2, the message template 124 selected by the transmission originator user 2, and records the read message template in the storage device 120 as the draft message 121. Alternatively, in accordance with the operation by the transmission originator user 2, the CPU 110 adds an edition to the draft message 121, and records the data of the edited draft message 121.

Next, the CPU 110 performs a message verifying process (step S02). In this step, the CPU 110 verifies the words contained in the draft message 121, and if the draft message contains any words not understandable to the destination user 1, the draft message 121 is presented to the transmission originator user 2 with these words in an emphasized manner. Details of this operation will be discussed later.

Next, the CPU 110 checks a verification result from the transmission originator user 2 (step S03). In this step, the transmission originator user 2 checks a verification result shown to the transmission originator user 2 in step S02, and the CPU 110 accepts a response. More specifically, when the words not understandable to the destination user 1 is not contained in the draft message 121 shown in step S02 or when such words are contained but the transmission originator user 2 decided to accept, the transmission originator user 2 inputs in the message processing device 10 an instruction not to edit the draft message 121 again. Conversely, when the draft message 121 contains the words not understandable to the destination user 1, and the transmission originator user 2 desires to edit the draft message 121 again, the transmission originator user inputs an instruction to edit again.

The CPU 110 determines whether or not the transmission originator user 2 desires to edit the draft message 121 again based on the input details (step S04). When the transmission originator user 2 desires to edit again (step S04: YES), the CPU 110 returns the process to step S01, and creates and edits again (step S01) the draft message in accordance with the operation by the transmission originator user 2. Conversely, when the transmission originator user 2 does not desire to edit again (step S04: NO), the CPU 110 terminates the message creating process.

According to the message creating process described in the above paragraph, the message processing device 10 creates the message to be transmitted to the destination user 1 from the transmission originator user 2. In particular, the message processing device 10 detects the words not understandable to the destination user 1 and contained in the draft message 121, and shows such words to the transmission originator user 2 according to the message verifying process (step S02) described above. Hereinafter, the message verifying process will be explained with reference to a flowchart illustrated in FIG. 5.

Figure 5:
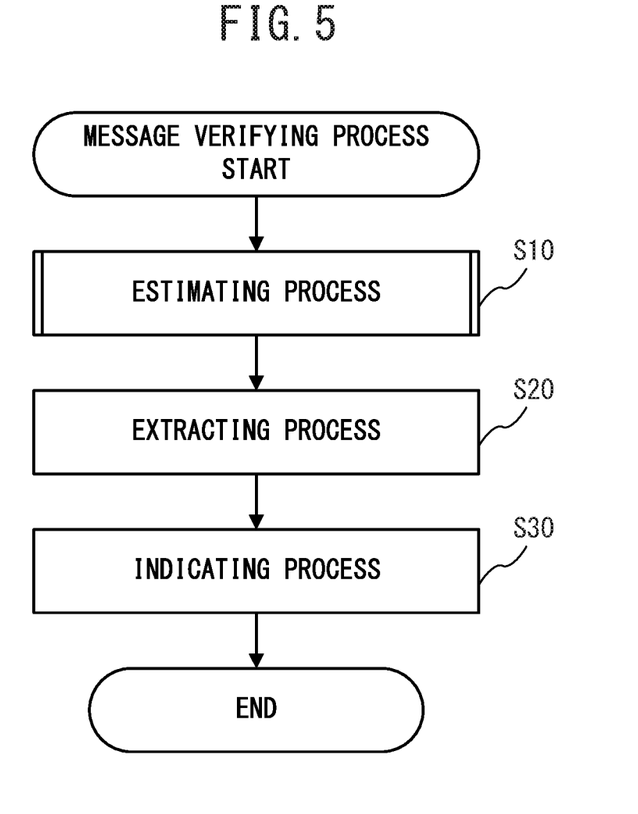
FIG. 5 is a flowchart illustrating a message verifying process.

At the beginning of the message verifying process, the CPU 110 executes an estimating process S10, and estimates the words that are understandable to the destination user 1. By executing this process, the CPU 110 functions as the estimator 11. Details of the estimating process S10 will be discussed later.

Subsequent to the estimating process S10, the CPU 110 executes an extracting process S20. In the extracting process S20, the CPU 110 reads the draft message 121 from the storage device 120. Next, the CPU 110 extracts, from the read draft message 121, portions that do not match the words estimated in the estimating process S10. By executing this process, the CPU 110 functions as the extractor 12.

Subsequent to the extracting process S20, the CPU 110 executes an indicating process S30. In the indicating process S30, the CPU 110 displays the draft message 121 on the display 140. At this time, the CPU displays the portions of the draft message 121 extracted in the extracting process S20 in an emphasized manner. As for the emphasizing scheme, any arbitrary schemes, such as blinking characters, changing a font, and changing the size are applicable. By executing this process, the CPU 110 functions as the indicator 13. In addition, after completing the indicating process S30, the CPU 110 terminates the message verifying process.

According to the message verifying process described in the above paragraph, the message processing device 10 is capable of clearly showing, to the transmission originator user 2, the words contained in the draft message 121 that are estimated as not understandable to the destination user 1. The transmission originator user 2 edits this portion in the draft message 121, and changes this portion to words understandable to the destination user 1, and thus the message composed of only the words understandable to the destination user 1 can be easily created.

Figure 6:
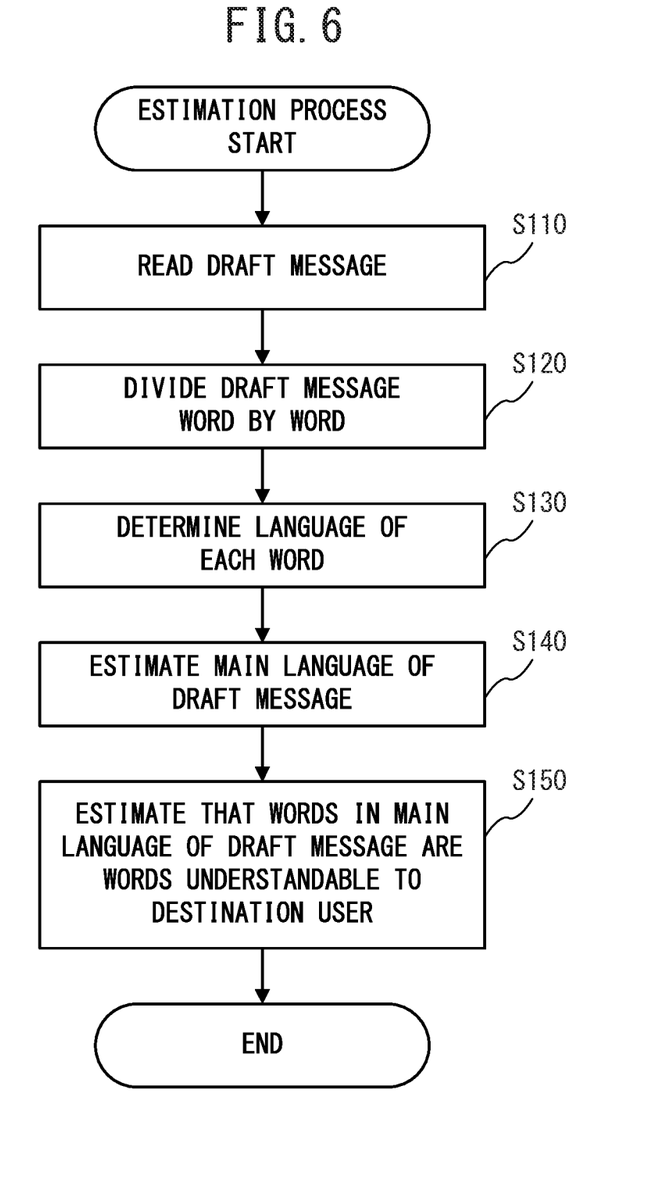
FIG. 6 is a flowchart illustrating an estimating process of the first embodiment.

Hereinafter, the estimating process S10 described above will be explained in more detail with reference to FIG. 6.

At the beginning of the estimating process S10, the CPU 110 reads the draft message 121 from the storage device 120 (step S110).

Next, the CPU 110 divides the read draft message 121 word by word (step S120). More specifically, the CPU 110 performs a morphological analysis or the like to divide the draft message 121 word by word. Example languages processable by the message processing device 10 are Japanese that does not clearly indicate a segment between words, and also English that clearly indicates a segment as the space being inserted between the words. In order to be able to divide a message of any language word by word, the CPU 110 divides the message by the morphological analysis or the like.

Subsequently, the CPU 110 determines what language is applied to each word in the draft message 121 that has been divided word by word (step S130). More specifically, the CPU 110 reads the words from the draft message 121 that has been divided in step S120 in the draft message 121, and determines to what language the read words belong by referring to the language determination library 123. Alternatively, the CPU 110 identifies a character code of the words, and determines to what language the read words belong based on the identified character code. By performing this determination up to the last word in the draft message 121, the language of all words contained in the draft message 121 is determined.

Next, the CPU 110 estimates what is the main language in the draft message 121 (step S140). More specifically, as a consequence of the determination of the language for each word in the draft message 121 in step S130, the CPU 110 estimates the main language of the draft message 121 to be the language to which the majority of words belong. Alternatively, as a consequence of step S130, the language that is contained in the draft message at a greater rate than a predetermined threshold value (a predetermined value, for example, 30%) may be estimated as the main language of the draft message 121.

Next, the CPU 110 estimates that the words that belong to the main language in the draft message 121 are the words understandable to the destination user 1 (step S150). After completing step S150, the CPU 110 terminates the estimating process S10.

According to the estimating process S10 described in the above paragraph, the CPU 110 estimates the words understandable to the destination user 1 based on the draft message 121. Based on the words estimated in the estimating process S10, the CPU 110 executes the subsequent processes (the extracting process S20 and the indicating process S30). In the extracting process S20, the CPU 110 extracts any portion that does not match the words in the draft message 121 which are estimated in the estimating process S10. Subsequently, the CPU 110 indicates, to the transmission originator user 2, the draft message 121 with the portion extracted in the extracting process in an emphasized manner.

By employing such an operation, the message processing device 10 provides, to the transmission originator user 2, the function to easily create the draft message 121 by word understandable to the destination user 1.

In the operation described above, the message processing device 10 estimates the main language of the draft message 121 by performing the word analysis on the draft message 121. However, the message processing device 10 does not always need to perform the word analysis. For example, the message processing device 10 may estimate that the language to which the message template 124 applied when the draft message 121 is created is the main language of the draft message.

In addition, when the draft message 121 contains a portion composed of the characters of a character code not applicable in the main language, the message processing device 10 may indicate this portion in an emphasized manner.

The message processing device 10 estimates the main language in the draft message 121. Hence, when, for example, a specific additional phrase (for example, a signature in an electronic mail) is automatically added to the draft message 121, the additional phrase can be selected based on the main language in the draft message 121, and properly added thereto. In this case, the message processing device 10 records beforehand, in the storage device 120, a different additional phrase language by language. Subsequently, the message processing device 10 selects, among the multiple recorded additional phrases, an additional phrase that belongs to the same language as the estimated main language for the draft message 121, and adds the selected additional phrase to the draft message 121. Thereafter, the message processing device 10 transmits, to the destination user 1, the draft message 121 to which the additional phrase has been added.

Second Embodiment

In the first embodiment described above, the explanation was given of the message processing device 10 that estimates the words understandable to the destination user 1 based on the draft message 121 or the message template 124 utilized to create the draft message 121. In a second embodiment, in addition to this operation, an explanation will be given of a message processing device 20 that estimates the words understandable to the destination user 1 based on a response from the destination user 1 at a previous point of time to the creation of the draft message 121.

Figure 7:
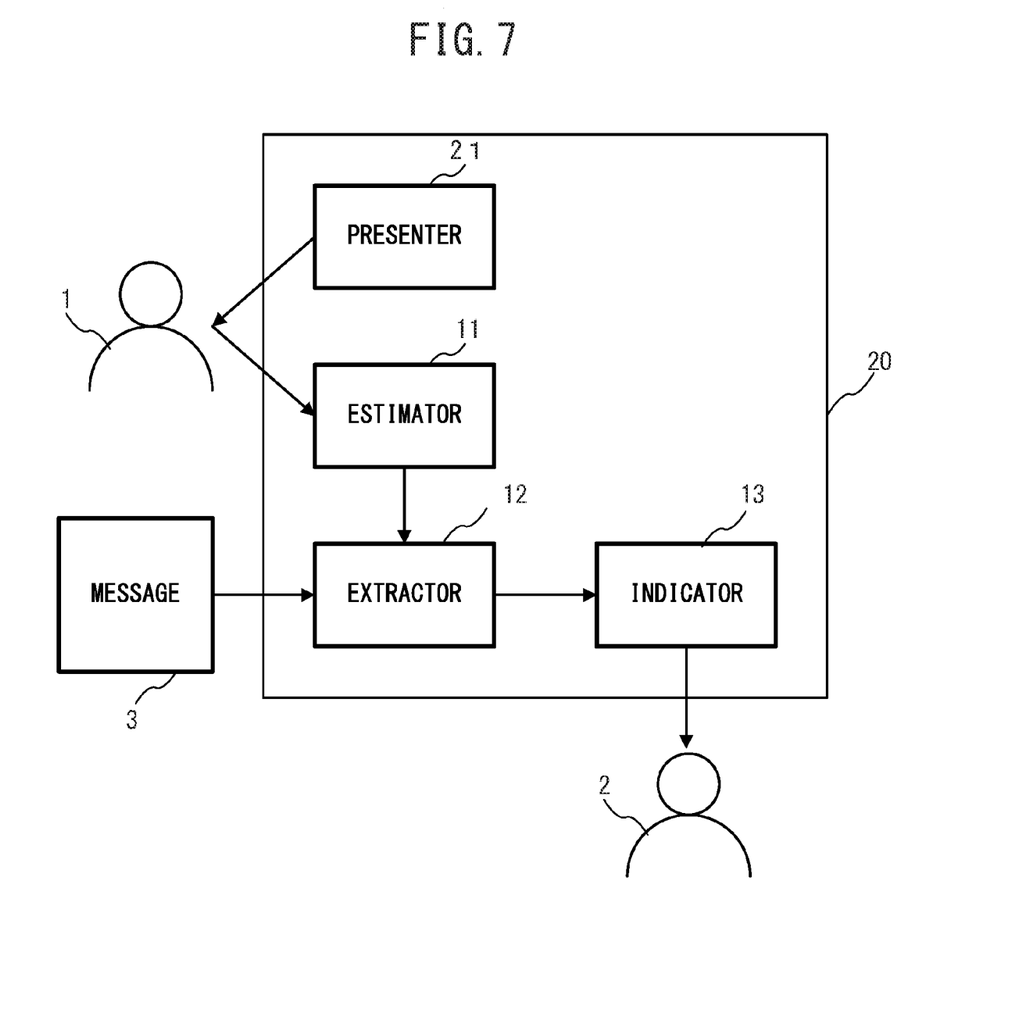
FIG. 7 is a block diagram illustrating a functional structure of the message processing device of the first embodiment.

The message processing device 20 of the second embodiment includes, as illustrated in FIG. 7, the estimator 11, the extractor 12, the indicator 13, and a presenter 21 as functions. Among these components, the estimator 11, the extractor 12, and the indicator 13 are the same as those of the message processing device 10 of the first embodiment, and thus the explanation thereof will be omitted.

The presenter 21 has a function that presents an indication that asks for a response to the destination user 1. When, for example, the transmission originator user 2 is a shop, the presenter 21 presents, to the destination user 1 (the client of the shop), a shipping method of a purchased product, a payment method for the purchase, and the like as choices. When the destination user 1 makes a selection in accordance with the details presented by the presenter 21, the transmission originator user 2 (the shop) refers to the selection made by the destination user 1, and thus the shop can react in accordance with the details spesicied by the destination user 1.

The message processing device 20 has the same hardware structure (see FIG. 2) as those of the message processing device 10 of the first embodiment, and with these hardware structures, respective functions (the estimator 11, the extractor 12, the indicator 13, and the presenter 21) described above are realized. The operations of the respective hardware are the same as those of the first embodiment, and thus the explanation thereof will be omitted.

Hereinafter, an explanation will be given of a process (a response recording process) in which the message processing device 20 records, in a response record 125, a response from the destination user 1.

Figure 8:
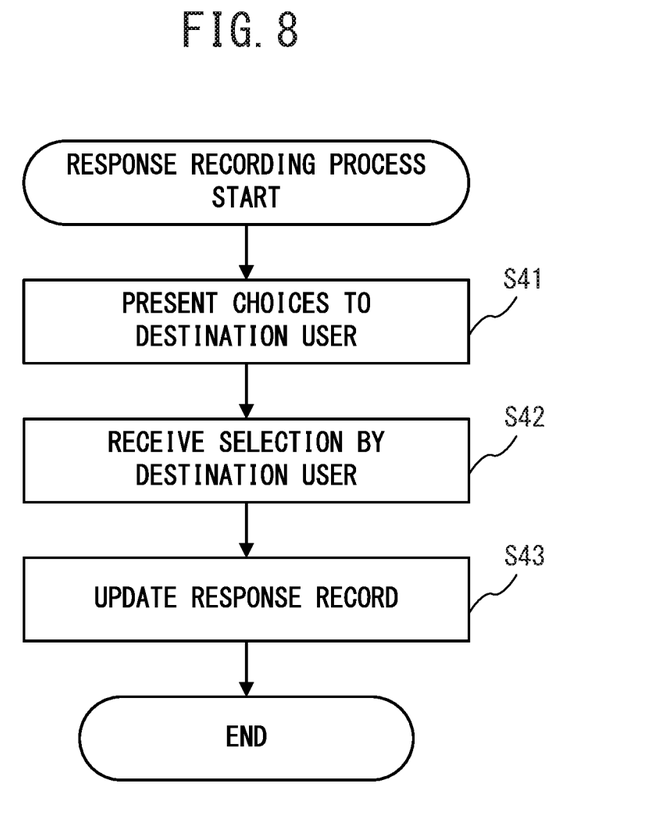
FIG. 8 is a flowchart illustrating a response recording process.

When the destination user 1 who is the customer of the shop purchases a product or the like from the transmission originator user 2 who is the shop, information, such as a shipping method by the transmission originator user 2 will be transmitted to the transmission originator user 2 from the destination user 1. Accordingly, when there is a necessity to transmit information to the transmission originator user 2 from the destination user 1, the message processing device 20 starts the response recording process as illustrated in FIG. 8.

In the initial stage of the response recording process, the CPU 110 presents choices to the destination user (step S41). As for the information to be transmitted to the transmission originator user 2 from the destination user 1, such as a shipping method and a payment method for the purchase, the CPU 110 presents, to the destination user 1, details that represents these pieces of information in multiple choice format. In this case, the CPU 110 presents, as will be discussed later, choices expressing the same concept in multiple languages. Accordingly, the CPU 110 functions as the presenter 21.

Next, the CPU 110 receives a selection given by the destination user 1 (step S42). The CPU 110 accepts, from the destination user 1, information indicating the choice selected by the destination user 1 among the choices presented in step S41.

Next, the CPU 110 updates, based on the received information, the response record 125 recorded in the storage device 120 (step S43). Accordingly, the words selected in a previous time by the destination user 1 when given a choice are recorded and accumulated in the storage device 120 as the response record 125. After completing step S43, the CPU 110 terminates the response recording process.

Figure 9:
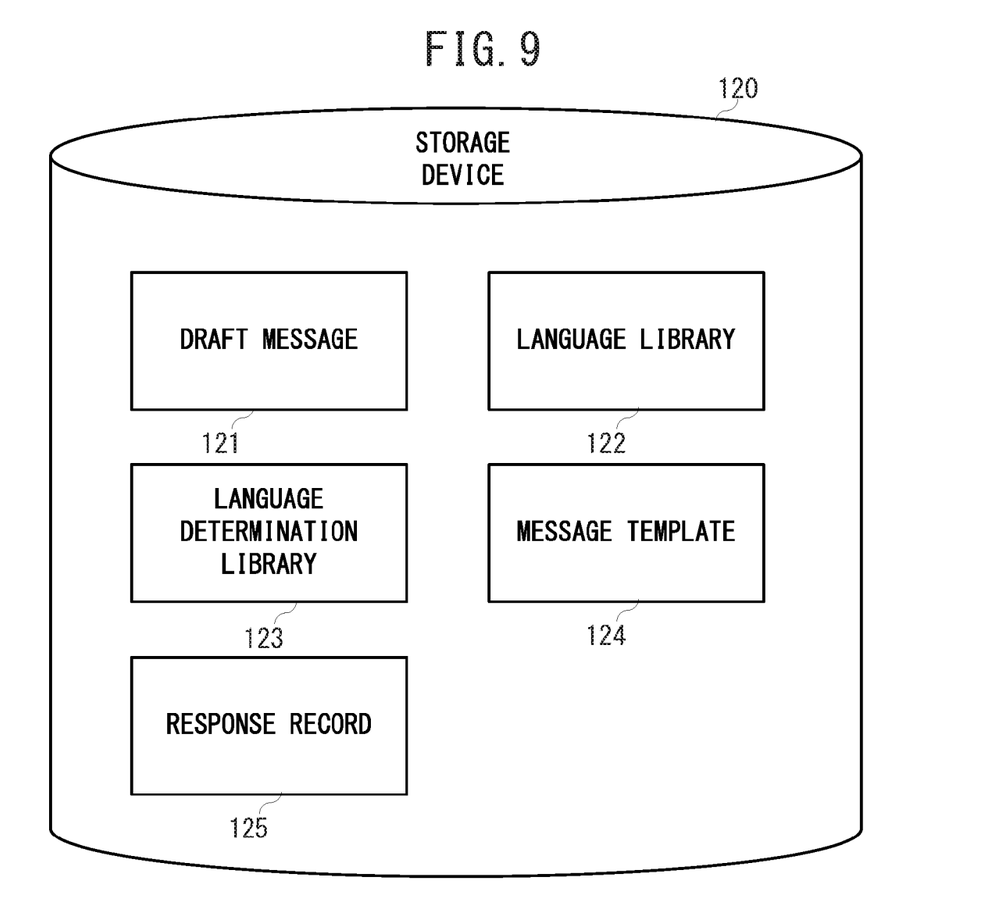
FIG. 9 is a diagram for explaining a memory area provided in a storage device.

The storage device 120 of the message processing device 20 has, as illustrated in FIG. 9, an area to record the response record 125 in addition to the area to record the draft message 121, the area to record the language library 122, the area to record the language determination library 123, and the message template 124. The response record 125 is data that records the response from the destination user 1 accepted by the message processing device 20 in the aforementioned response recording process. The draft message 121, the language library 122, the language determination library 123, and the message template 124, are the same as those explained in the first embodiment, and thus the explanation thereof will be omitted.

As described above, the message processing device 20 utilizes the function of the presenter 21 to present multiple choices to the destination user 1, and allows the destination user 1 to select a desired choice among those choices. In this case the choices presented by the message processing device 20 contain choices that express the same concept in multiple languages.

Figure 10:
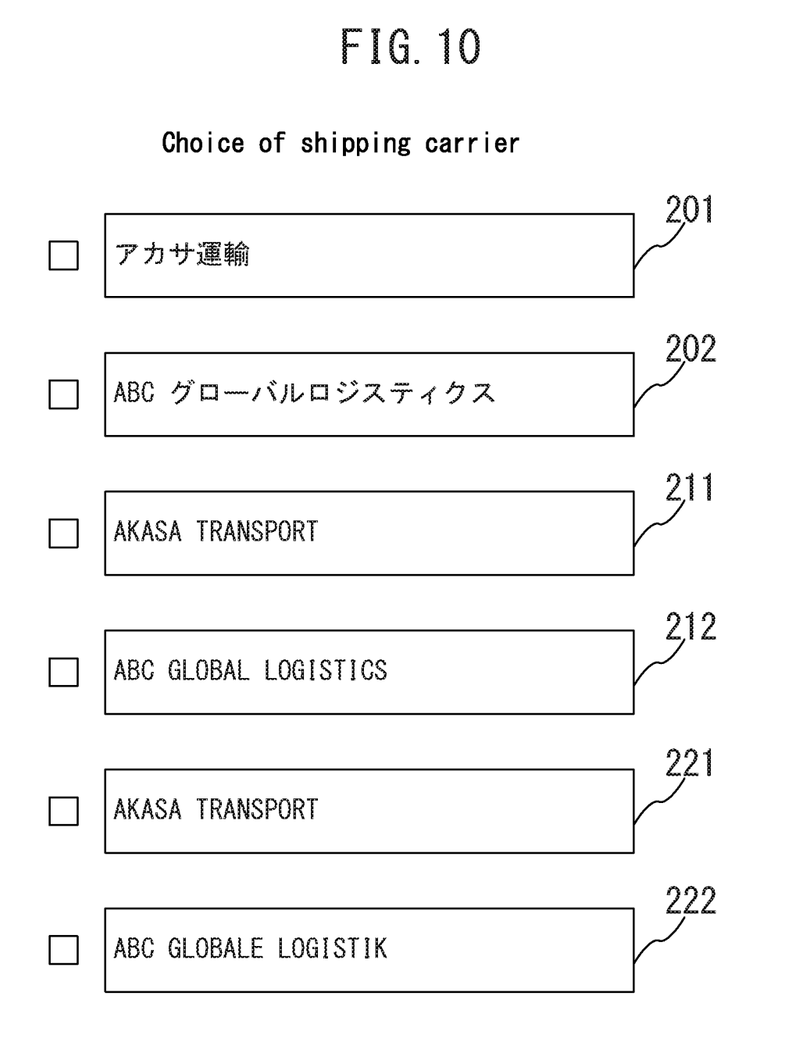
FIG. 10 is a diagram illustrating example choices presented by a presenter to a destination user.

As for the example choices expressing the same concept in multiple languages, the message processing device 20 presents, to the destination user 1, a screen as illustrated in FIG. 10. In this example, in a screen that allows the destination user 1 to select a shipping carrier for shipping the purchased product, the presenter 21 shows the same shipping carrier (AKASA TRANSPORT) in three language choices that are a choice 201 expressed in Japanese, a choice 211 expressed in English, and a choice 221 expressed in German. In addition, as for another shipping carrier (ABC GLOBAL LOGISTICS), the presenter 21 also shows three language choices, that are, a choice 202 expressed in Japanese, a choice 212 expressed in English, and a choice 222 expressed in German.

When the destination user 1 selects the choice 201 based on the details illustrated in FIG. 10, a detail that the destination user 1 has selected the choice 201, and the words of the choice 201 are recorded in the response record 125. When the message processing device 20 performs the message verifying process at a later time, the message processing device 20 estimates that the words "AKASA TRANSPORT" are understandable to the destination user 1 since the response record 125 has a record of the words from the choice 201 selected by the destination user 1. Likewise, when the destination user 1 has selected the choice 212, the message processing device 20 estimates, based on the detail of the response record 125, that the words "ABC GLOBAL LOGISTICS" written in the choice 212 are understandable to the destination user 1.

Like the first embodiment, the message processing device 20 executes the message verifying process that includes the estimating process S10, the extracting process S20, and the indicating process S30. The extracting process S20 and the indicating process S30 are the same as those in the first embodiment, and thus the explanation thereof will be omitted.

Figure 11:
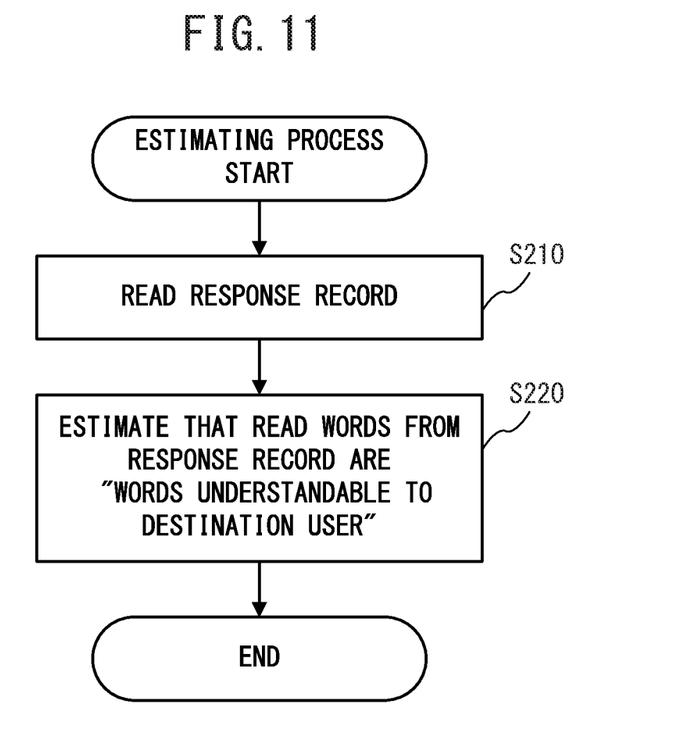
FIG. 11 is a flowchart illustrating an estimating process according to a second embodiment.

The message processing device 20 executes the estimating process S10 according to a flowchart illustrated in FIG. 11.

At the beginning of the estimating process S10, the CPU 110 reads the response record 125 from the storage device 120 (step S210).

Next, the CPU 110 estimates that the words recorded in the read response record 125 are the words understandable to the destination user 1 (step S220). After completing step S220, the CPU 110 terminates the estimating process S10.

The message processing device 20 estimates the words understandable to the destination user 1 by executing the above estimating process S10. Subsequently, the message processing device executes the extracting process S20, and the indicating process S30 to realize a situation that the draft message 121 is prevented from containing the words not understandable to the destination user 1.

The message processing device 20 estimates that the words selected in a previous time by the destination user 1 when given a choice are the words understandable to the destination user 1. More specifically, the message processing device 20 presents, to the destination user 1, multiple choices including a first choice expressing a concept in a first language (for example, Japanese), and a second choice expressing the same concept in a second language (for example, English). If the destination user 1 selected the first choice in the past time, the message processing device 20 estimates that the words contained in the first choice are the words understandable to the destination user 1. In addition, if the destination user 1 selected the second choice in the past time, the message processing device 20 estimates that the words contained in the second choice are the words understandable to the destination user 1. Hence, the words understandable to the destination user 1 can be estimated with greater accuracy in comparison with the first embodiment.

None of the functions of the message processing device 20 are incompatible with the functions of the message processing device 10 in the first embodiment. Thus, the message processing device 20 may also have the functions explained in the first embodiment.

The message processing device according to the embodiments of the present disclosure can be realized by utilizing a normal computer system without relying on any specialized system. For example, the message processing device that executes the aforementioned processes may be constructed by storing a program for causing a computer to execute the above described operations in a computer-readable recording medium, such as a flexible disk, a Compact Disc-Read Only Memory (CD-ROM), a Digital Versatile Disk (DVD), or a Magnet Optical Disk (MO), and distributed, and by installing this program in a computer system. In addition, the program may be stored in a disk device or the like of a server device over the Internet, and, for example, downloaded to a computer in the manner superimposed on carrier waves.

Still further, the message processing device according to the embodiments of the present disclosure is not limited to a single device. Multiple computers may share the aforementioned respective functions to provide the respective functions as a single system constructed by those multiple computers.

The preferable embodiments of the present disclosure were described above in detail, but the present disclosure is not limited to any particular embodiments, and various modifications and changes can be made within the scope of the present disclosure as recited in appended claims.

In addition, it should be noted that the aforementioned embodiments are meant only to be illustrative and are not intended to limit the scope of the present disclosure. Therefore, the scope of the present disclosure is defined by the claims rather than the embodiments. Furthermore, various modifications made within the scope of the claims and within the same purposes thereof should be included within the scope of the present disclosure.

REFERENCE SIGNS LIST

1 Destination user
2 Transmission originator user
3 Message
10, 20 Message processing device
11 Estimator
12 Extractor
13 Indicator
21 Presenter
110 CPU
111 ROM
112 RAM
120 Storage device
121 Draft message
122 Language library
123 Language determination library
124 Message template
125 Response record
130 Control device
140 Display
150 Network interface
160 Internal bus

The invention claimed is:

1. A message processing device comprising:
at least one processor; and
a memory configured to store program code executable by the at least one processor, the program code comprising:
presenting code configured to cause at least one of the at least one processor to present a plurality of choices to a destination user, each of the plurality of choices expressing each of a plurality of different concepts in each of a plurality of different languages, and prompt the destination user to select a choice of the presented choices;
determining code configured to cause at least one of the at least one processor to determine a concept and a language regarding the choice selected by the destination user;
estimating code configured to cause at least one of the at least one processor to estimate words understandable to the destination user based on whether each of the words belongs to the determined language;
extracting code configured to cause at least one of the at least one processor to extract, from a message which a transmission originator user created with reference to the determined concept, a portion of the message that does not match the estimated words; and
indicating code configured to cause at least one of the at least one processor to indicate, to the transmission originator user, the message with the extracted portion being in an emphasized manner.

2. The message processing device according to claim 1, wherein the presenting code is further configured to cause at least one of the at least one processor to present the choices onto another device connected with the message processing device through a communication network.

3. A message processing method, executed by a computer, the method comprising:
presenting a plurality of choices to a destination user, each of the plurality of choices expressing each of a plurality of different concepts in each of a plurality of different languages, and prompting the destination user to select a choice of the presented choices;
determining a concept and a language regarding the choice selected by the destination user;
estimating words understandable to the destination user based on whether each of the words belongs to the determined language;
extracting from a message which a transmission originator user created with reference to the determined concept, a portion of the message that does not match the estimated words; and
indicating, to the transmission originator user, the message with the extracted portion being in an emphasized manner.

4. A non-transitory computer readable recording medium having stored therein a program that, when executed by a computer, causes the computer to:
present a plurality of choices to a destination user, each of the plurality of choices expressing each of a plurality of different concepts in each of a plurality of different languages, and prompt the destination user to select a choice of the presented choices;
determine a concept and a language regarding the choice selected by the destination user;
estimate words understandable to the destination user based on whether each of the words belongs to the determined language;
extract, from a message which a transmission originator user created with reference to the determined concept, a portion of the message that does not match the estimated words; and
indicate, to the transmission originator user, the message with the extracted portion being in an emphasized manner.

* * * * *